US012393666B2

(12) United States Patent
Fujimori

(10) Patent No.: US 12,393,666 B2
(45) Date of Patent: Aug. 19, 2025

(54) CONTROL METHOD FOR INFORMATION PROCESSING APPARATUS AND NON-TRANSITORY COMPUTER-READABLE STORAGE MEDIUM STORING PROGRAM

(71) Applicant: SEIKO EPSON CORPORATION, Tokyo (JP)

(72) Inventor: Toshiki Fujimori, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 262 days.

(21) Appl. No.: 18/190,337

(22) Filed: Mar. 27, 2023

(65) Prior Publication Data

US 2023/0306102 A1 Sep. 28, 2023

(30) Foreign Application Priority Data

Mar. 28, 2022 (JP) ................................. 2022-052158

(51) Int. Cl.
G06F 21/00 (2013.01)
G06F 21/44 (2013.01)

(52) U.S. Cl.
CPC .................................. G06F 21/44 (2013.01)

(58) Field of Classification Search
CPC ....................................................... G06F 21/44
See application file for complete search history.

(56) References Cited

U.S. PATENT DOCUMENTS

2014/0354611 A1* 12/2014 Monden ............. H04N 21/4122
345/204
2017/0212719 A1 7/2017 Fujimori
2020/0076809 A1* 3/2020 Natori ................. H04L 63/0853

FOREIGN PATENT DOCUMENTS

| JP | 2002-091642 A | 3/2002 |
| JP | 2013-120373 A | 6/2013 |
| JP | 2015-090561 A | 5/2015 |
| JP | 2016-071136 A | 5/2016 |
| JP | 2017-135490 A | 8/2017 |
| JP | 2020-038424 A | 3/2020 |
| JP | 2021-060757 A | 4/2021 |

OTHER PUBLICATIONS

"Operating Instructions: Geometric & Setup Management Software: Geometry Manager Pro Ver. 6.1". Panasonic Corporation, May 2021, pp. 1-48.
"Software Applications Download". Panasonic Connect Co., Ltd., Jan. 24, 2022, pp. 1-6.

* cited by examiner

Primary Examiner — Rodman Alexander Mahmoudi
(74) Attorney, Agent, or Firm — Oliff PLC

(57) ABSTRACT

A control method for an information processing apparatus includes receiving an input of first authentication information, performing authentication based on the first authentication information according to a program for controlling a first display apparatus, when the authentication based on the first authentication information is successful, transmitting a connection request including the first authentication information to the first display apparatus via a communication network, and, when the authentication by the first display apparatus is successful, connecting to the first display apparatus according to the program.

2 Claims, 10 Drawing Sheets

CONTROL METHOD FOR INFORMATION PROCESSING APPARATUS AND NON-TRANSITORY COMPUTER-READABLE STORAGE MEDIUM STORING PROGRAM The present application is based on, and claims priority from JP Application Serial Number 2022-052158, filed Mar. 28, 2022, the disclosure of which is hereby incorporated by reference herein in its entirety.

BACKGROUND

1. Technical Field

The present disclosure relates to a control method for an information processing apparatus and a non-transitory computer-readable storage medium storing a program.

2. Related Art

There has been proposed a method for authentication processing in a system in which an information processing apparatus such as a personal computer executes communication with a display apparatus. For example, JP-A-2016-71136 (Patent Literature 1) discloses a method in which, when authentication information of a user input in a projector is registered in an authentication server, the authentication server specifies a personal computer corresponding to the user and transmits, with the specified personal computer, data to the projector to enable the projector to project a screen.

As described in Patent Literature 1, it is complicated for the user to be requested to input the authentication information in the display apparatus.

SUMMARY

An aspect of the present disclosure is a control method for an information processing apparatus including: receiving an input of first authentication information; performing authentication based on the first authentication information according to a program for controlling a first display apparatus; when the authentication based on the first authentication information is successful, transmitting a connection request including the first authentication information to the first display apparatus via a communication network; and, when the authentication by the first display apparatus is successful, connecting to the first display apparatus according to the program.

Another aspect of the present disclosure is a non-transitory computer-readable storage medium storing a program for controlling a display apparatus, the program causing an information processing apparatus to execute processing including: receiving an input of authentication information; performing the authentication based on the authentication information; when the authentication based on the authentication information is successful, transmitting a connection request including the authentication information to the display apparatus via a communication network; and, when the authentication by the display apparatus is successful, connecting to the display apparatus.

DESCRIPTION OF EXEMPLARY EMBODIMENTS

1. First Embodiment

Embodiments of the present disclosure are explained below with reference to the drawings.

1-1. Configuration of a Display System

Figure 1:
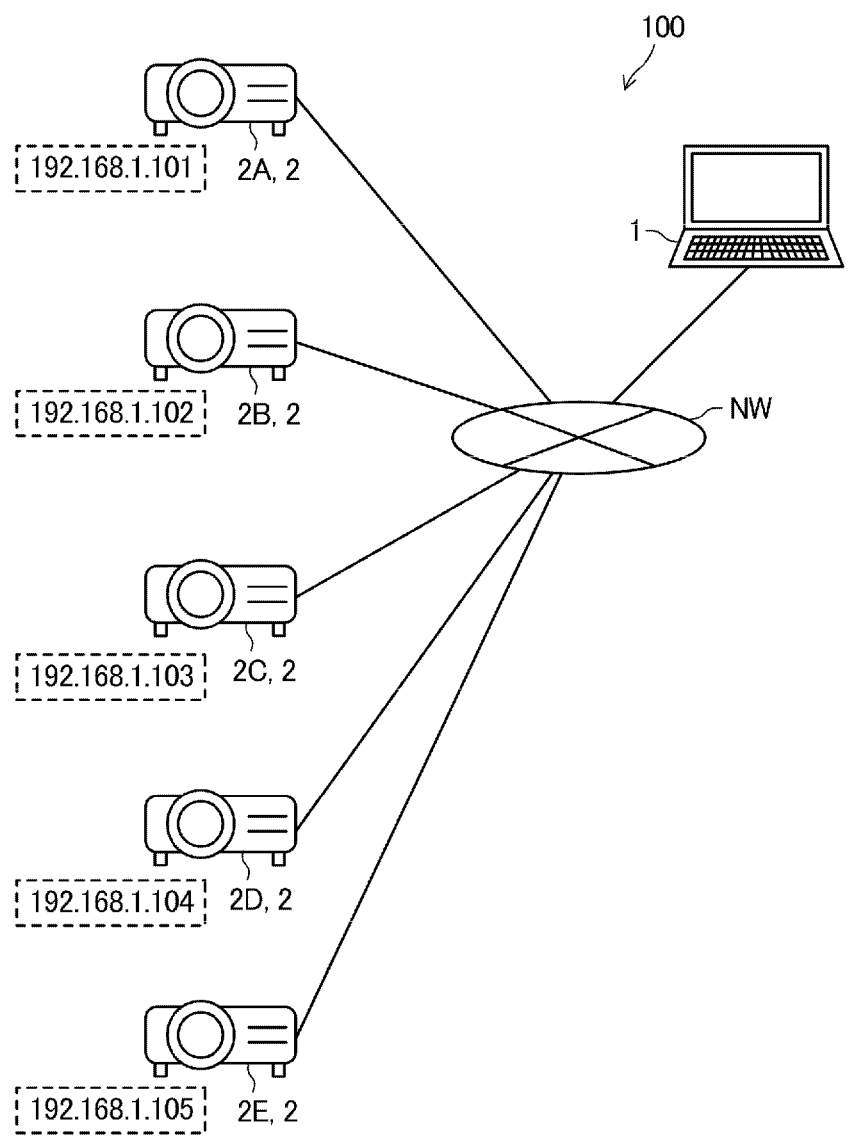
FIG. 1 is a diagram showing a configuration of a display system.

FIG. 1 is a diagram showing a configuration of a display system 100.

The display system 100 includes one or a plurality of PCs (Personal Computers) 1 and a plurality of projectors 2. The number of projectors 2 and the number of PCs 1 are not limited. In FIG. 1, as an example, a configuration of the display system 100 including one PC 1 and five projectors 2A, 2B, 2C, 2D, and 2E is shown. When the projectors 2A and 2B are not distinguished, the projectors 2A and 2B are described as projectors 2. The projectors 2 correspond to an example of the display apparatus. The PC 1 corresponds to an example of the information processing apparatus.

In FIG. 1, network addresses in a communication network NW, specifically, IP (Internet Protocol) addresses are illustrated for the five projectors 2. IP addresses of the projectors 2 are explained below.

The projectors 2 and the PC 1 are connected to be capable of performing data communication via the communication network NW. The communication network NW may be a LAN (Local Area Network) or may be a global network including a leased line, a public line network, and the Internet. In this embodiment, an example is explained in which the communication network NW is configured by a LAN. The communication network NW may be a wireless communication network such as Wi-Fi. Wi-Fi is a registered trademark.

The PC 1 connects to the projectors 2 via the communication network NW and controls an operation relating to projection of the projectors 2. The PC 1 shown in FIG. 1 is a notebook PC. However, this is an example. For example, the PC 1 may be a desktop PC, a tablet PC, or a smartphone.

In this embodiment, the projectors 2 project videos according to the control of the PC 1. The projectors 2 projecting the videos correspond to an example of the display. For example, the projectors 2 project videos onto a projection surface such as a screen based on video data output by the PC 1 via the communication network NW. The PC 1 connects to the projectors 2 to thereby perform control for causing the projectors 2 to start projection, control for performing setting of videos to be projected by the projectors 2, control for causing the projectors 2 to stop the projection, and the like.

The projectors 2 project image lights onto the projection surface to thereby display videos on the projection surface. The projection surface may be a curtain-like screen or may be a wall surface of a building or a surface of an installed object.

1-2. Configuration of the Projector

Figure 2:
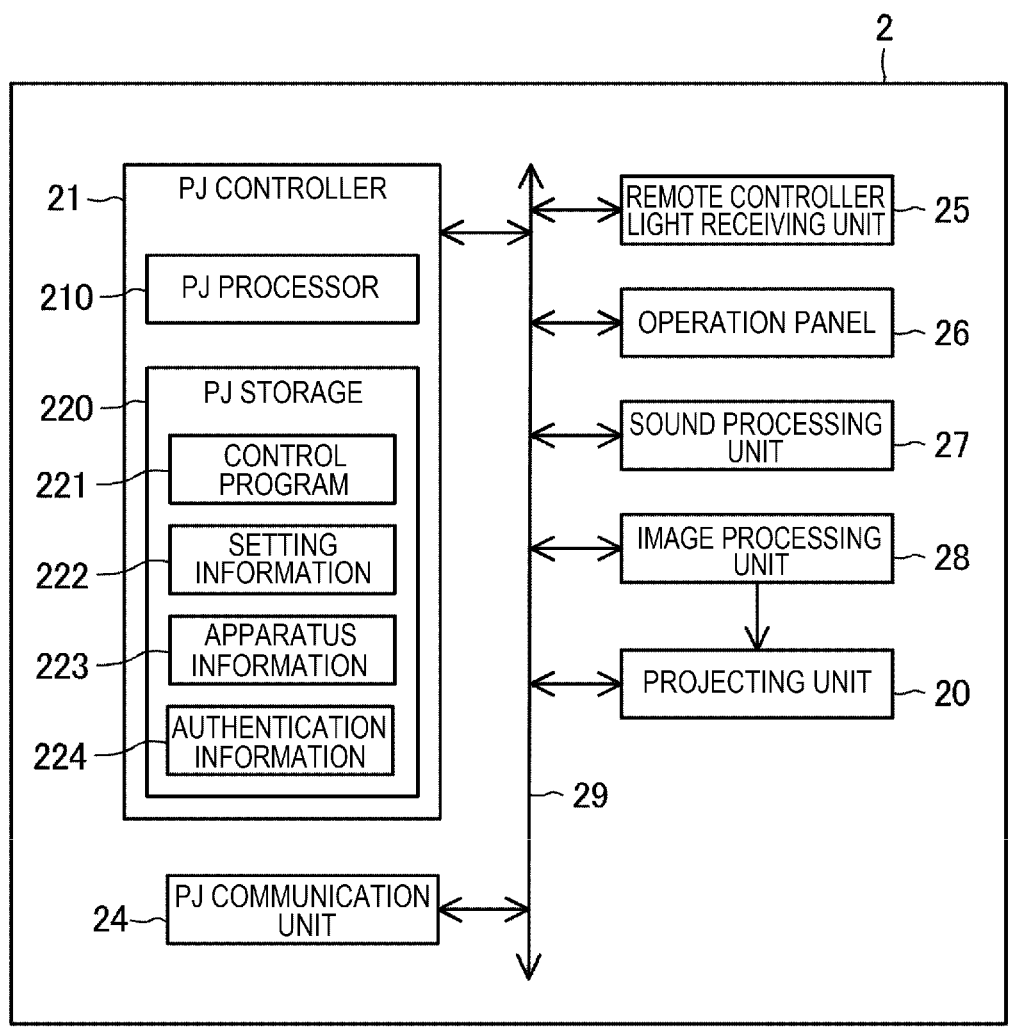
FIG. 2 is a diagram showing a configuration of a projector in a first embodiment.

FIG. 2 is a diagram showing a configuration of the projectors 2 in the first embodiment. A basic configuration is common to the projectors 2 included in the display system 100.

A projector 2A includes a PJ (Projector) controller 21. The PJ controller 21 includes a PJ processor 210 configured by a CPU (Central Processing Unit), an MPU (Micro-processing unit), or the like and a PJ storage 220. The PJ controller 21 executes a program with the PJ processor 210 to thereby control the units of the projector 2.

The PJ storage 220 is a nonvolatile storage device configured by a semiconductor element such as a flash memory. The PJ storage 220 stores programs to be executed by the PJ processor 210, data to be processed by the PJ processor 210, and the like. The PJ storage 220 stores, for example, a control program 221, setting information 222, apparatus information 223, and authentication information 224.

The apparatus information 223 includes information concerning the projector 2 and specifically is information for an apparatus connected to the projector 2 via the communication network NW to identify the projector 2. The apparatus information 223 includes, for example, a network address of the projector 2 in the communication network NW. The apparatus information 223 includes, for example, a name given to the projector 2 in advance. The name of the projector 2 may be common to the plurality of projectors 2. However, it is preferable that a different name is given to each of the projectors 2 connected to the same communication network NW.

The PJ storage 220 may include a volatile storage region and configure a work area for temporarily storing programs to be executed by the PJ processor 210 and processing target data.

The PJ processor 210 reads out and executes the control program 221 stored by the PJ storage 220 to thereby execute various kinds of processing through cooperation of hardware and software.

The projector 2 includes a projecting unit 20 that projects image light onto the projection surface. The projecting unit 20 is connected to the PJ controller 21 by a bus 29. The projecting unit 20 includes, for example, a light source, a light modulation device, and a projection optical system. The light source is lit according to the control of the PJ controller 21 and emits light toward the light modulation device. A specific configuration of the light source is not limited. Examples of the light source includes lamps such as a halogen lamp, a xenon lamp, and an ultrahigh pressure mercury lamp and solid-state light sources such as an LED and a laser light source. The light modulation device modulates the light emitted by the light source. A specific configuration of the light modulation device is not limited. For example, the light modulation device can be configured by a transmissive liquid crystal panel, a reflective liquid crystal panel, or a digital mirror device (Digital Micromirror Device). The projection optical system included in the projecting unit 20 includes a lens, a mirror, and a prism for focusing image light modulated by the light modulation device on the projection surface.

The projecting unit 20 may include a light source driving circuit that supplies electric power to the light source and a driving circuit that causes the light modulation device to execute drawing. The projecting unit 20 may include a zoom mechanism and a focus adjusting mechanism that performs adjustment of a focus.

The projector 2 includes a PJ communication unit 24, a remote controller light receiver 25, an operation panel 26, a sound processor 27, and an image processor 28. These units are connected to the PJ controller 21 via the bus 29.

The PJ communication unit 24 is a communication device that is connected to the communication network NW and executes communication with the PC 1 via the communication network NW. The PJ communication unit 24 includes, for example, a connector to which an Ethernet cable is connected and a communication circuit that transmits and receives signals. Ethernet is a registered trademark. The PJ communication unit 24 may be a wireless communication device that executes wireless communication such as Wi-Fi.

The remote controller light receiver 25 receives a radio signal transmitted by a not-shown remote control device. The remote controller light receiver 25 decodes the received signal to thereby generate an operation signal and outputs the operation signal to the PJ controller 21. The radio signal received by the remote controller light receiver 25 is, for example, an infrared signal but may be another signal.

The operation panel 26 is provided in a housing of the projector 2 and includes various switches operable by a user. The operation panel 26 outputs an operation signal to the PJ controller 21 according to a switch being operated.

The sound processor 27 is connected to a not-shown speaker. The sound processor 27 outputs sound from a speaker according to the control of the PJ controller 21.

The image processor 28 executes, according to the control of the PJ controller 21, image processing for video data input from the PC 1 or a not-shown image source. Examples of the image processing executed by the image processor 28 include resolution conversion processing, resize processing, geometric correction processing, digital zoom processing, luminance adjustment processing, projecting position correction processing. For example, when the plurality of projectors 2 are disposed side by side and execute tiling projection, the image processor 28 executes edge blending processing. A type of the image processing executed by the image processor 28 is designated by the PJ controller 21. Parameters and data for arithmetic operations used for the image processing by the image processor 28 are input to the image processor 28 from the PJ controller 21. The image processor 28 generates a display signal for displaying a video after the image processing and outputs the display signal to the light modulation device of the projecting unit 20. The PJ controller 21 sets, based on the setting information 222, the parameters and the data for the arithmetic operations for the image processing by the image processor 28.

The PJ controller 21 receives input operation of the user with the remote controller light receiver 25 or the operation panel 26. The PJ controller 21 causes the projecting unit 20 to project a video according to input operation of the user. For example, the PJ controller 21 controls the image processor 28 to execute image processing for video data and controls the light source and the light modulation device of the projecting unit 20 to thereby cause the projecting unit 20 to project a video processed by the image processor 28 onto the projection surface. The PJ controller 21 controls the sound processor 27 to output sound from the not-shown speaker.

The PJ controller 21 executes authentication processing when the projector 2 is started to be used. The authentication information 224 is used for the authentication processing. The authentication information 224 is authentication information of the projector 2 and is configured by, for example, a combination of a user ID and a password. The authentication information 224 can be set for each of the projectors 2. For example, the projectors 2A, 2B, 2C, 2D, and 2E may respectively include different pieces of authentication information 224.

The PJ controller 21 executes the authentication processing based on the authentication information 224 when the PC 1 accesses the projector 2 via the communication network NW. Specifically, the PJ controller 21 receives authentication information transmitted by the PC 1 and collates the received authentication information and the authentication information 224. When the authentication information received from the PC 1 and the authentication information 224 satisfy a predetermined condition, the PJ controller 21 determines that the PJ controller 21 has succeeded in authentication of the PC 1. The predetermined condition means that, for example, the authentication information received from the PC 1 and the authentication information 224 coincide. When the PJ controller 21 has succeeded in the authentication, the PC 1 becomes capable of controlling the projector 2 with an application program 122 explained below.

The PJ controller 21 may perform the authentication processing when the user directly operates a remote controller or the operation panel 26 of the projector 2 and uses the projector 2. In this case, the PJ controller 21 executes the authentication by collating information input by the remote controller or the operation panel 26 with the authentication information 224. When the PJ controller 21 has succeeded in the authentication processing, the user becomes capable of using the projector 2.

The image processor 28 may be configured by, for example, an integrated circuit. The integrated circuit of this type includes an LSI, an ASIC (Application Specific Integrated Circuit), a PLD (Programmable Logic Device), an FPGA (Field-Programmable Gate Array), and an SoC (System-on-a-chip). An analog circuit may be included in a part of a configuration of the integrated circuit. The integrated circuit and the PJ controller 21 may be integrated.

The projector 2 may include, in addition to the PJ communication unit 24, an interface connected to equipment functioning as a video source. For example, the projector 2 includes an interface including communication hardware such as a connector and an interface circuit conforming to a predetermined communication standard. The interface is a digital interface such as an HDMI (High-Definition Multimedia Interface), a Displayport, an HDBaseT, or a USB (Universal Serial Bus). HDMI and HDBaseT are registered trademarks. The projector 2A may include, as an interface, an analog video terminal such as an RCA terminal, a VGA terminal, an S terminal, or a D terminal and may be capable of receiving an analog video signal.

1-3. Configuration of the PC

Figure 3:
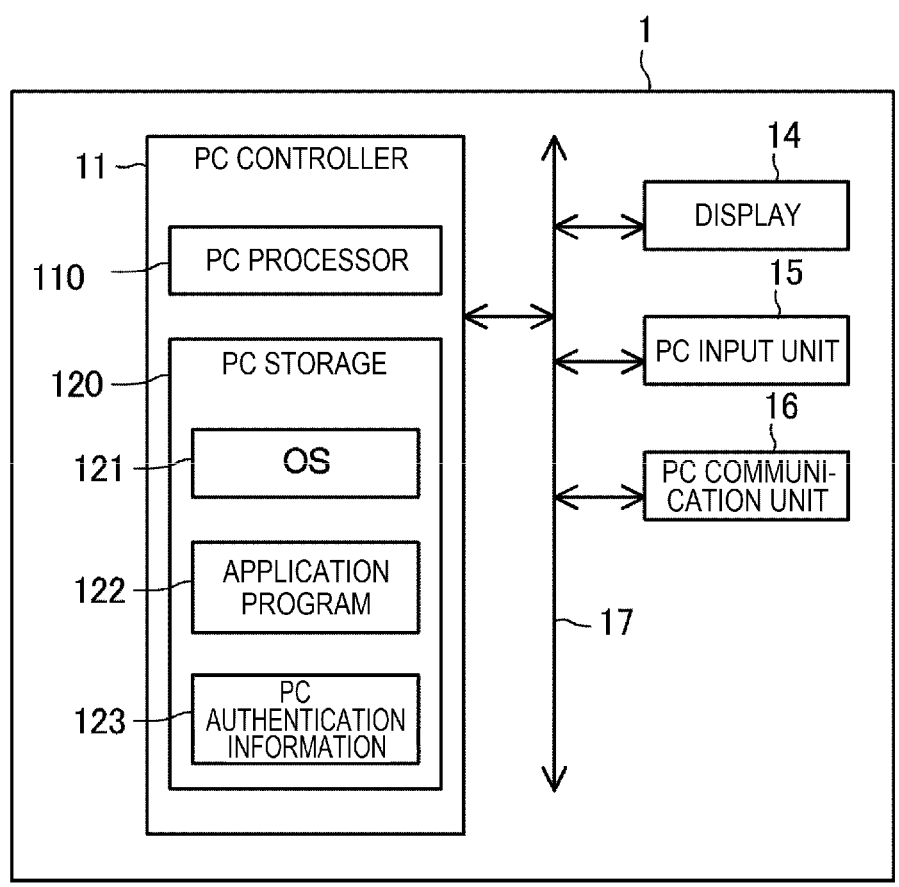
FIG. 3 is a diagram showing a configuration of a PC in the first embodiment.

FIG. 3 is a diagram showing a configuration of a PC 1 in the first embodiment.

The PC 1 includes a PC controller 11, a display 14, a PC input unit 15, and a PC communication unit 16. These units are connected to one another by a bus 17.

The PC controller 11 includes a PC processor 110 and a PC storage 120. The PC processor 110 is configured by a processor such as a CPU or an MPU. The PC controller 11 executes programs with the PC processor 110 to thereby control the units of the PC 1.

The PC storage 120 is a storage device that stores data in a nonvolatile manner with a flash memory, a magnetic recording medium, an optical recording medium, or the like. The PC storage 120 stores programs to be executed by the PC processor 110, data to be processed by the PC processor 110, and the like. The PC storage 120 stores, for example, an OS (Operating System) 121, an application program 122, and PC authentication information 123. The OS 121 is basic control software for controlling the PC 1 and provides a platform on which the application program 122 is executed. The application program 122 is a program for including a function of outputting a video to the projector 2. The PC authentication information 123 is authentication information used for authentication for the user, who operates the PC 1, to use the application program 122.

The display 14 includes an LCD (Liquid Crystal Display) panel. The display 14 may include a display panel such as an LED (Light Emitting Diode) panel or an OLED (Organic LED) panel. The display 14 displays an image and a video according to the control of the PC controller 11. The display 14 may be a display device connected to the outside of the PC 1.

The PC input unit 15 includes an input device operated by the user of the PC 1 or is connected to the input device. The input device is a switch panel including operation switches, a touch panel, a mouse, a keyboard, or the like. The PC input unit 15 detects operation of the user on the input device and outputs a detection result to the PC controller 11.

The PC communication unit 16 is a communication device that performs communication according to a predetermined communication standard. The PC communication unit 16 is a communication device that is connected to the communication network NW and executes communication with the projector 2 via the communication network NW. The PC communication unit 16 includes, for example, a connector to which an Ethernet cable is connected and a communication circuit that transmits and receives signals. The PC communication unit 16 may be a wireless communication device that executes wireless communication such as Wi-Fi.

When starting the application program 122 according to operation of the user, the PC controller 11 executes authentication processing based on the PC authentication information 123. The PC authentication information 123 is authentication information set in advance in the PC 1 and is configured by, for example, a combination of a user ID and a password. The PC authentication information 123 can be set for each of the PCs 1. The PC authentication information 123 is authentication information corresponding to the application program 122. Accordingly, in a configuration in which the PC 1 is capable of executing a plurality of application programs 122, different PC authentication information 123 may be set for each of the application programs 122. In this case, the PC 1 stores a plurality of pieces of PC authentication information 123 in the PC storage 120. The PC storage 120 stores the respective pieces of PC authentication information 123 and the application programs 122 in association with each other.

The PC controller 11 receives an input of the user with the PC input unit 15. When execution of the application program 122 is instructed by the input of the user, the PC controller 11 receives, with the PC input unit 15, an input of authentication information by the user. The PC controller 11 collates the input authentication information and the PC authentication information 123. When the input authentication information and the PC authentication information 123 satisfy a predetermined condition, the PC controller 11 determines that the PC controller 11 has succeeded in authentication. The predetermined condition means that, for example, the input authentication information and the PC authentication information 123 coincide. When succeeding the authentication, the PC controller 11 executes the application program 122.

The PC controller 11 executes the application program 122 to thereby control the projector 2. The control of the projector 2 by the application program 122 includes, for example, control for causing the projector 2 to start projection, control for performing setting of a video projected by the projector 2, and control for causing the projector 2 to stop the projection.

In this embodiment, in a state in which the PC 1 and the projector 2 are connected to the communication network NW, the PC 1 searches for the projector 2 with which the PC 1 can communicate. The PC 1 attempts an access to the projector 2 detected by the search with a function of the application program 122 and requests the projector 2 to execute authentication processing. The projector 2 executes the authentication processing according to the access by the PC 1. This operation is explained below.

1-4. Operation of the Projector

Figure 4:
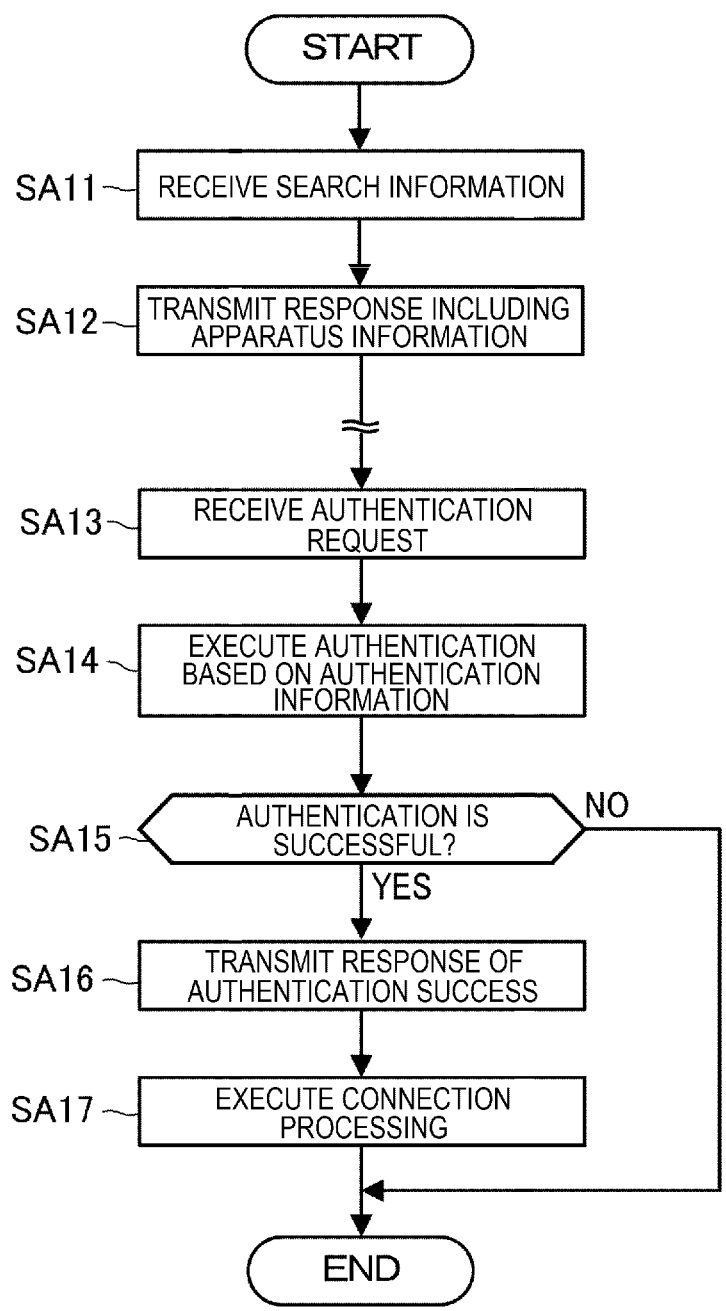
FIG. 4 is a flowchart showing an operation of the projector in the first embodiment.

FIG. 4 is a flowchart showing an operation of the projector 2 in the first embodiment.

When receiving search information from the PC 1 (step SA11), the PJ controller 21 transmits a response including the device information 223 to the PC 1 (step SA12).

Thereafter, the PC 1 receives the response and transmits an authentication request to the projector 2 as explained below. The PJ controller 21 receives the authentication request with the PJ communication unit 24 and accepts the authentication request (step SA13). The authentication request includes authentication information.

The PJ controller 21 executes authentication based on the authentication information 224 in response to the authentication request (step SA14). Specifically, the PJ controller 21 collates the authentication information included in the authentication request received from the PC 1 and the authentication information 224. When the received authentication information and the authentication information 224 satisfy a predetermined condition, the PJ controller 21 determines that the PJ controller 21 has succeeded in authentication of the PC 1. When the received authentication information and the authentication information 224 do not satisfy the predetermined condition, the PJ controller 21 determines that the PJ controller 21 has failed in the authentication.

The PJ controller 21 determines a result of the authentication (step SA15). When failing in the authentication (NO in step SA15), the PJ controller 21 ends this processing.

When succeeding in the authentication (YES in step SA15), the PJ controller 21 transmits a response indicating the authentication success to the PC 1 (step SA16). Thereafter, the PJ controller 21 executes connection processing in response to a request from the PC 1 (step SA17). The connection processing includes processing for establishing communication between the PC 1 and the projector 2. The connection processing includes processing for bringing, with the function of the application program 122 executed by the PC 1, the PC 1 into a state in which the PC 1 is capable of controlling the projector 2.

1-5. Operation of the PC

Figure 5:
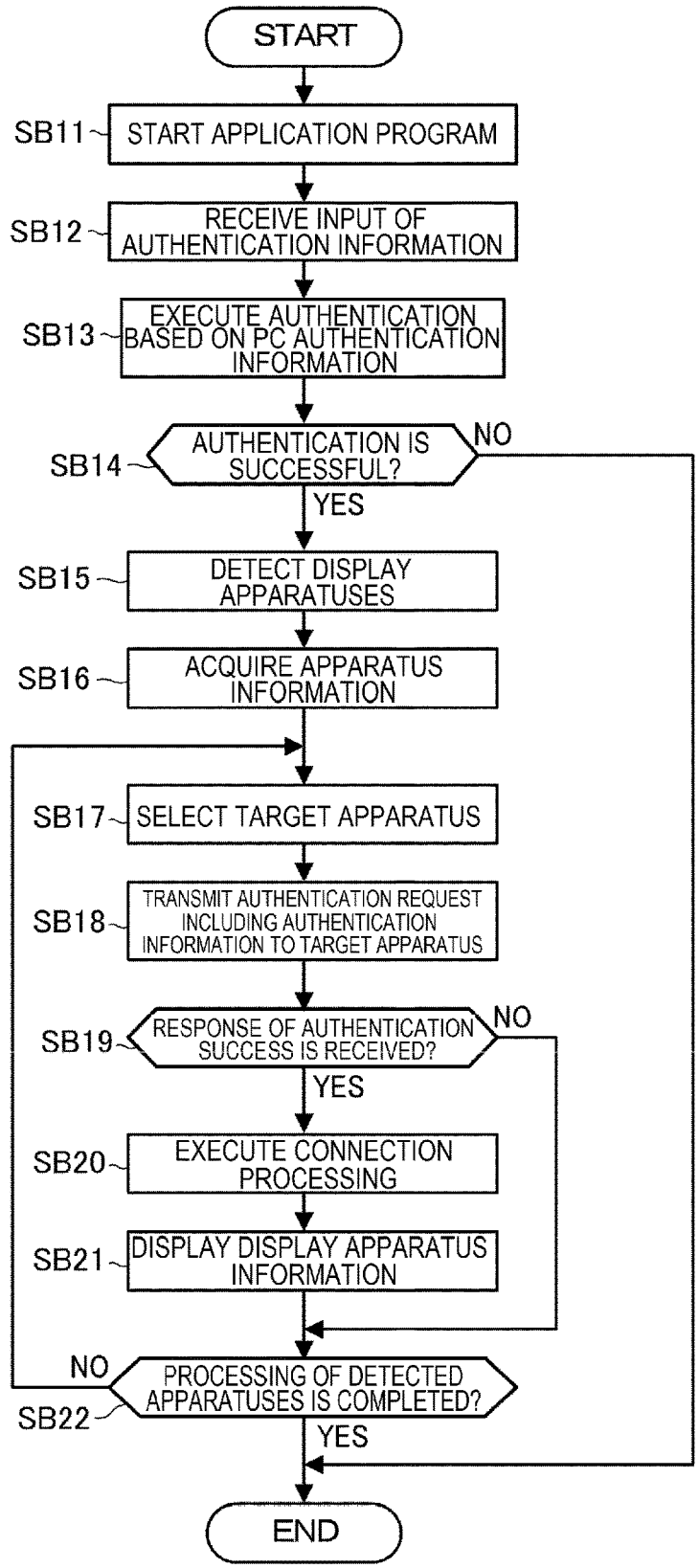
FIG. 5 is a flowchart showing an operation of the PC in the first embodiment.

FIG. 5 is a flowchart showing an operation of the PC 1 in the first embodiment.

The PC controller 11 starts the application program 122 according to operation of the user received by the PC input unit 15 (step SB11). The PC controller 11 receives, with the PC input unit 15, an input of authentication information by the user (step SB12). In step SB 12, the PC controller 11 displays, with the function of the application program 122, on the display 14, a message for requesting the input of the authentication information and an input box.

The PC controller 11 executes authentication processing based on the PC authentication information 123 (step SB13). In step SB13, the PC controller 11 collates the authentication information received in step SB12 and the PC authentication information 123. When the input authentication information and the PC authentication information 123 satisfy a predetermined condition, the PC controller 11 determines that the PC controller 11 has succeeded in authentication. When the input authentication information and the PC authentication information 123 does not satisfy the predetermined condition, the PC controller 11 determines that the PC controller 11 has failed in the authentication.

The PC controller 11 determines a result of the authentication (step SB14). When failing in the authentication (NO in step SB14), the PC controller 11 ends the application program 122 and ends this processing.

When succeeding in the authentication (YES in step SB14), the PC controller 11 executes a search in the communication network NW to thereby detect the projectors 2 capable of communicating via the communication network NW (step SB15). In step SB15, the PC controller 11 broadcasts a signal for searching for an apparatus to, for example, another apparatus belonging to a network segment to which the PC 1 belongs in the communication network NW. The signal for searching for an apparatus is a signal for requesting the PC 1 to transmit a response including apparatus information.

FIG. 1 shows an example of IPv4 addresses of the projectors 2A, 2B, 2C, 2D, and 2E in the case in which the communication network NW is configured by a LAN. The IPv4 addresses are addresses of a class C. An address of a network section is "192.168.1". In the example shown in FIG. 1, the PC controller 11 broadcasts a signal in step SB15 such that pieces of equipment having IP addresses with a common network section can receive the signal. When the communication network NW is configured by Wi-Fi, a network segment is a network designated by one SSID (Service Set Identifier). In this case, the PC controller 11 broadcasts a signal in step SB15 such that pieces of equipment belonging to a network having the same SSID as an SSID of the PC 1 can receive the signal.

In step SB15, the PC controller 11 specifies pieces of equipment that have transmitted responses to the signal transmitted by the PC 1 and detects projectors 2 in the pieces of equipment. The PC controller 11 acquires the apparatus information 223 of the detected projectors 2 from the responses transmitted by the projectors 2 (step SB16).

The PC controller 11 selects one or a plurality of projectors 2 set as processing targets out of the projectors 2 detected in step SB15 (step SB17). In this embodiment, the PC controller 11 selects one projector 2.

The PC controller 11 transmits an authentication request including the PC authentication information 123 to the projector 2 set as the processing target (step SB18). The projector 2 executes the processing in steps SA13 to SA16 in FIG. 4 in response to the authentication request of the PC 1.

The PC controller 11 determines whether a response indicating authentication success is received from the projector 2 (step SA19). When the response indicating the authentication success is not received from the projector 2 within a predetermined time after the authentication request is transmitted to the projector 2 (NO in step SA19), the PC controller 11 shifts to step SB22 explained below.

When the response indicating the authentication success is received from the projector 2 (YES in step SB19), the PC controller 11 executes connection processing (step SB20). The connection processing is processing corresponding to step SA17 in FIG. 4 and includes processing in which the PC 1 requests, with the function of the application program 122, the projector 2 to be connected and establishes communication between the PC 1 and the projector 2. The connection processing includes processing in which the PC 1 brings the projector 2 into a controllable state with the function of the application program 122 executed by the PC 1.

Thereafter, the PC controller 11 displays, on the display 14, display apparatus information including the apparatus information 223 of the projector 2 for which the connection processing is performed (step SB21) and shifts to step SB22.

In step SB22, the PC controller 11 determines whether the processing for all the projectors 2 detected in step SB15 has been completed (step SB22). When steps SB17 to SB19 have been executed for all the projectors 2 detected in step SB15 (YES in step SB22), the PC controller 11 ends this processing. When there is the projector 2 not selected as the processing target among the projectors 2 detected in step SB15 (NO in step SB22), the PC controller 11 returns to step SB17.

Figure 6:
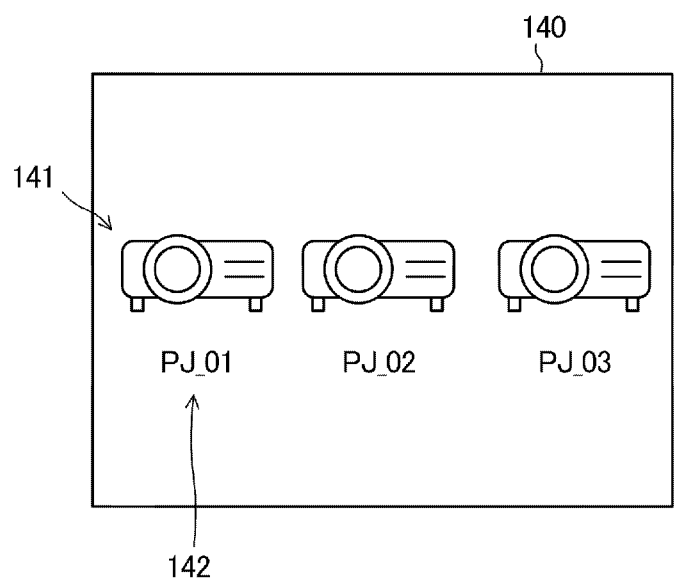
FIG. 6 is a diagram showing an example of a screen displayed by the PC.

FIG. 6 is a diagram showing an example of a screen displayed by the PC 1 and shows an example of a state in which the display apparatus information is displayed in step SB21.

An apparatus information screen 140 is a screen displayed on the display 14 by the control of the PC controller 11 and includes an icon 141 and apparatus information 142. The icon 141 is an image indicating that the projector 2 is detected and indicates the projector 2 to which the PC controller 11 have connected in step SB20 in FIG. 5. For example, when the PC controller 11 connects to three projectors 2 by the processing in FIG. 5, three icons 141 are displayed on the apparatus information screen 140.

The apparatus information 142 is information included in the PC authentication information 123 acquired from the projector 2 by the PC controller 11. For example, the apparatus information 142 is a name of the projector 2. The apparatus information 142 is displayed in association with the icon 141. The apparatus information 142 may include a network address of the projector 2 and other information.

The user can visually check, with the apparatus information screen 140, the number of projectors 2 to which the PC 1 have connected and names and the like of the projectors 2.

1-6. Effects and the Like

As explained above, the control method for the information processing apparatus of the present disclosure includes the PC 1 receiving an input of first authentication information and performing authentication based on the PC authentication information 123, which is the first authentication information, according to the application program 122, which is a program for controlling a first display apparatus. The control method includes, when the authentication based on the first authentication information is successful, the PC 1 transmitting a connection request including the first authentication information to the first display apparatus via the communication network NW. The control method includes, when authentication by the first display apparatus is successful, the PC 1 connecting to the first display apparatus according to the application program 122. The first display apparatus is anyone of the projectors 2A, 2B, 2C, 2D, and 2E.

With this method, the PC 1 performs authentication processing by the application program 122 based on the authentication information received by the PC 1. When succeeding in authentication by the application program 122, the PC 1 connects to the projector 2 based on the authentication information. Accordingly, the user can connect, by inputting authentication information of the application program 122, the PC 1 and the projector 2 for which authentication is necessary. Therefore, it is possible to, without omitting the authentication concerning the connection of the PC 1 and the projector 2, reduce a burden on the user concerning the authentication.

In the control method for the information processing apparatus of the present disclosure, the PC 1 controls a second display apparatus according to the application program 122. The control method may include, when the authentication based on the first authentication information is successful, the PC 1 transmitting a connection request including the first authentication information to the second display apparatus via the communication network NW. The control method may include, when authentication by the second display apparatus is successful, the PC 1 connecting to the second display apparatus according to the application program 122. The second display apparatus is the projector 2 that is not the first display apparatus among the projectors 2A, 2B, 2C, 2D, and 2E. For example, when the first display apparatus is the projector 2A, the second display apparatus is any one of the projectors 2B, 2C, 2D, and 2E.

With this method, the PC 1 performs the authentication processing by the application program 122 based on the authentication information received by the PC 1 and, when succeeding in the authentication by the application program 122, connecting to the plurality of projectors 2. Accordingly, the user can connect the PC 1 to the plurality of projectors 2 by inputting the authentication information authenticated by the application program 122. Therefore, it is possible further reduce the burden on the user concerning the authentication.

The application program 122 of the present disclosure is a program for controlling the projector 2, the application program 122 causing the PC 1 to execute processing including receiving an input of authentication information and performing authentication based on the authentication information. The application program 122 causes the PC 1 to execute processing including, when the authentication based on the authentication information is successful, transmitting a connection request including the authentication information to a display apparatus via a communication network. The application program 122 causes the PC 1 to execute processing including, when authentication by the display apparatus is successful, connecting to the first display apparatus according to the application program 122.

With this program, the PC 1 performs authentication processing by the application program 122 based on the authentication information received by the PC 1 and, when succeeding in the authentication by the application program 122, connecting to the projector 2. Accordingly, the user can connect the PC 1 to the projector 2 by inputting the authentication information authenticated by the application program 122. Therefore, it is possible to reduce, without omitting authentication concerning use of the application program 122 and authentication concerning connection of the PC 1 and the projector 2, a burden on the user concerning the authentication.

2. Second Embodiment

Figure 7:
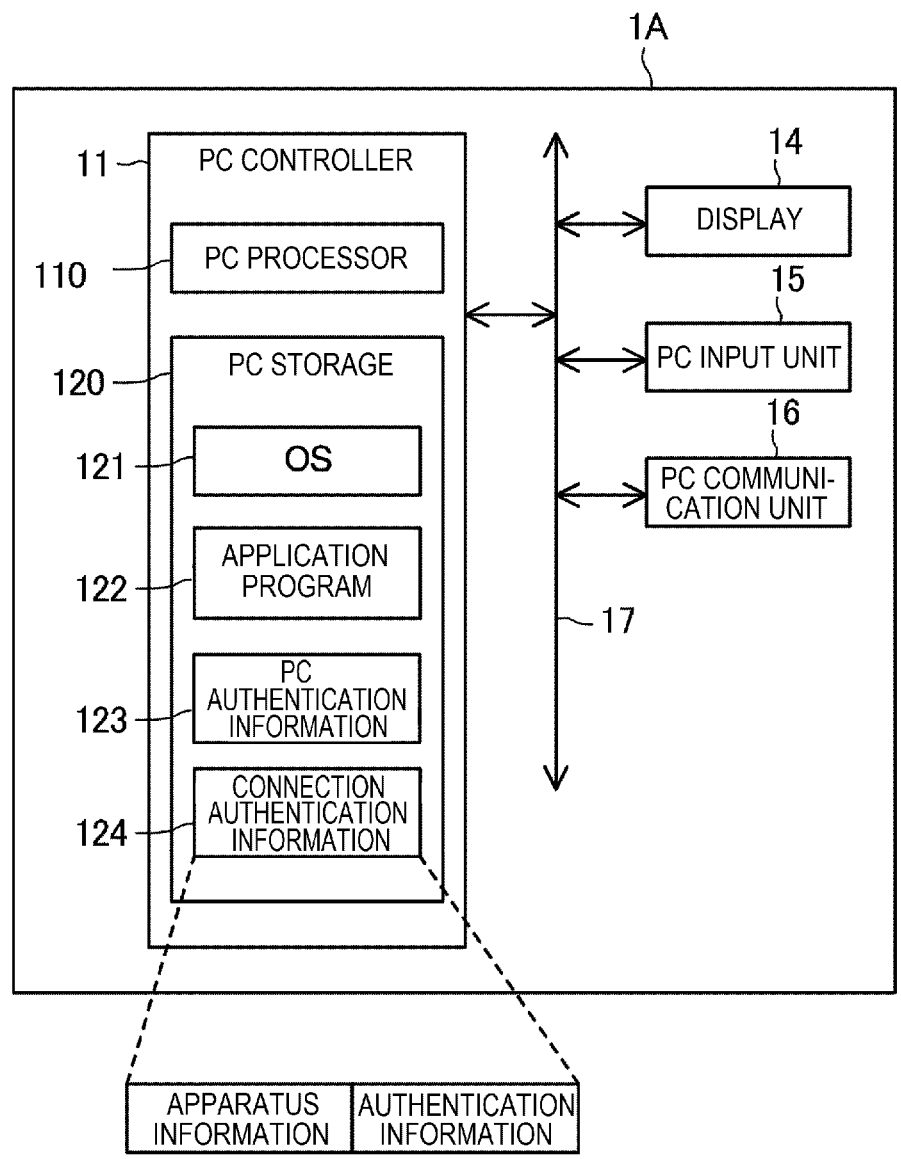
FIG. 7 is a diagram showing a configuration of a PC in a second embodiment.
Figure 8:
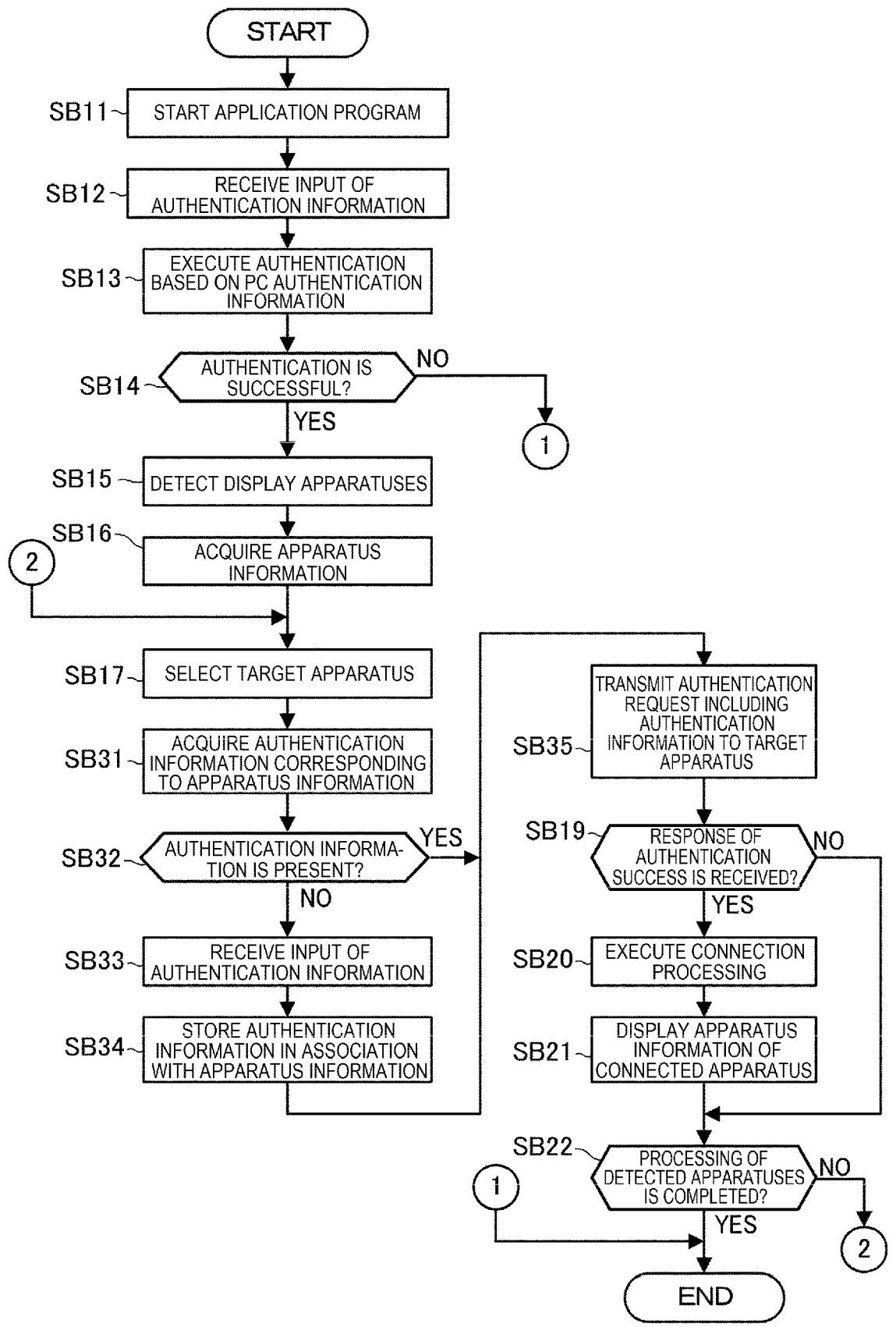
FIG. 8 is a flowchart showing an operation of the PC in the second embodiment.

FIG. 7 is a diagram showing a configuration of a PC 1A in a second embodiment. FIG. 8 is a flowchart showing an operation of the PC 1A in the second embodiment. The second embodiment is explained with reference to the figures. In the configuration of the PC 1A shown in FIG. 7, components common to the PC 1 explained in the first embodiment are denoted by the same reference numerals and signs and explanation of the components is omitted. Kinds of processing common to the operation of the PC 1 explained in the first embodiment in the operation shown in FIG. 8 are denoted by the same step numbers and explanation of the kinds of processing is omitted.

The PC 1A is an information processing apparatus provided instead of the PC 1 in the display system 100 shown in FIG. 1. The second embodiment is an example in which at least a part of the projectors 2A, 2B, 2C, 2D, and 2E connected to the PC 1A has the authentication information 224 different from the authentication information 224 of the other projectors 2. A configuration and an operation of the respective projectors 2 are the same as the configuration and the operation explained with reference to FIG. 4. That is, as in the first embodiment, each of the plurality of projectors 2 executes the authentication processing based on the authentication information 224 stored in the PJ storage 220.

As shown in FIG. 7, in the second embodiment, the PC 1A stores connection authentication information 124 in the PC storage 120. The connection authentication information 124 includes apparatus information of the projector 2 and authentication information transmitted to the projector 2 when the PC 1A connects to the projector 2 in association with each other. The apparatus information of the projector 2 is, for example, the apparatus information 223 acquired from the projector 2 by the PC 1A.

The number of pieces of connection authentication information 124 stored by the PC storage 120 is not limited. The PC 1A can store, in the PC storage 120, the connection authentication information 124 corresponding to the number of projectors 2 to which the PC 1A connects. In other words, the PC 1A stores, in the PC storage 120, the connection authentication information 124 corresponding to the respective projectors 2 included in the display system 100.

In the operation of the PC 1A shown in FIG. 8, after selecting a processing target projector 2 in step SB 17, the PC controller 11 acquires authentication information corresponding to the PC authentication information 123 of the processing target projector 2 (step SB31). In step SB31, the PC controller 11 acquires, from the connection authentication information 124 stored by the PC storage 120, authentication information associated with the PC authentication information 123 acquired instep SB16 from the processing target projector 2.

The PC controller 11 determines whether authentication information corresponding to the PC authentication information 123 of the processing target projector 2 is present (step SB32). That is, the PC controller 11 determines whether authentication information associated with the PC authentication information 123 acquired in step SB16 from the processing target projector 2 is present in the connection authentication information 124.

When the authentication information corresponding to the PC authentication information 123 of the processing target projector 2 is present (YES in step SB32), the PC controller 11 shifts to step SB35 explained below.

When the authentication information corresponding to the PC authentication information 123 of the processing target projector 2 is absent (NO in step SB32), the PC controller 11 receives an input of authentication information by the PC input unit 15 (step SB33). In step SB33, the PC controller 11 may display, with the function of the application program 122, on the display 14, a message for requesting the input of the authentication information and an input box.

The PC controller 11 generates the connection authentication information 124 by associating the authentication information received in step SB33 and the PC authentication information 123 of the processing target projector 2 and stores the connection authentication information 124 in the PC storage 120 (step SB34). Thereafter, the PC controller 11 shifts to step SB35.

In step SB35, the PC controller 11 transmits an authentication request including the authentication information to the processing target projector 2 (step SB35). The authentication request transmitted in step SB35 includes the authentication information acquired in step SB31 or the authentication information received in step SB33.

The PC 1A according to the second embodiment stores, in the PC storage 120, the connection authentication information 124 including authentication information corresponding to each of the plurality of projectors 2. Consequently, even when the plurality of projectors 2 included in the display system 100 have pieces of authentication information 224 different from one another, the PC 1A can connect to the projector 2 with the function of the application program 122.

In this way, the configuration explained in the second embodiment achieves the same effects as the effects of the configuration explained in the first embodiment.

Further, in a control method for an information processing apparatus according to the second embodiment of the present disclosure, the PC 1A controls a third display apparatus according to the application program 122. The control method includes the PC 1A receiving second authentication information different from the first authentication information and transmitting, via a communication network, a connection request including the second authentication information to the third display apparatus different from the first display apparatus. The control method includes, when succeeding in authentication by the third display apparatus, the PC 1A connecting to the third display apparatus according to the application program 122. The second authentication information is authentication information received in step SB33. The third display apparatus is any one of the projectors 2A, 2B, 2C, 2D, and 2E included in the display system 100 and, more specifically, is the projector 2 for which it is determined in step SB32 that the authentication information is absent.

With this method, the PC 1A is capable of connecting to the projector 2 that performs the authentication using the authentication information different from the PC authentication information 123 of the PC 1A. Accordingly, the PC 1A can be connected to a larger number of projectors 2 by operation of the user. Therefore, it is possible to reduce a burden on the user in connecting the PC 1A to the plurality of projectors 2.

The control method for the information processing apparatus explained above may include, when succeeding in the authentication by the third display apparatus, the PC 1A storing the second authentication information in association with the third display apparatus.

Consequently, since the PC 1A stores the received authentication information as the connection authentication information 124 in association with the third display apparatus, when the PC 1A connects to the third display apparatus again, the PC 1A does not have to receive an input by the user. Accordingly, it is possible to further reduce the burden on the user concerning the authentication.

3. Third Embodiment

Figure 9:
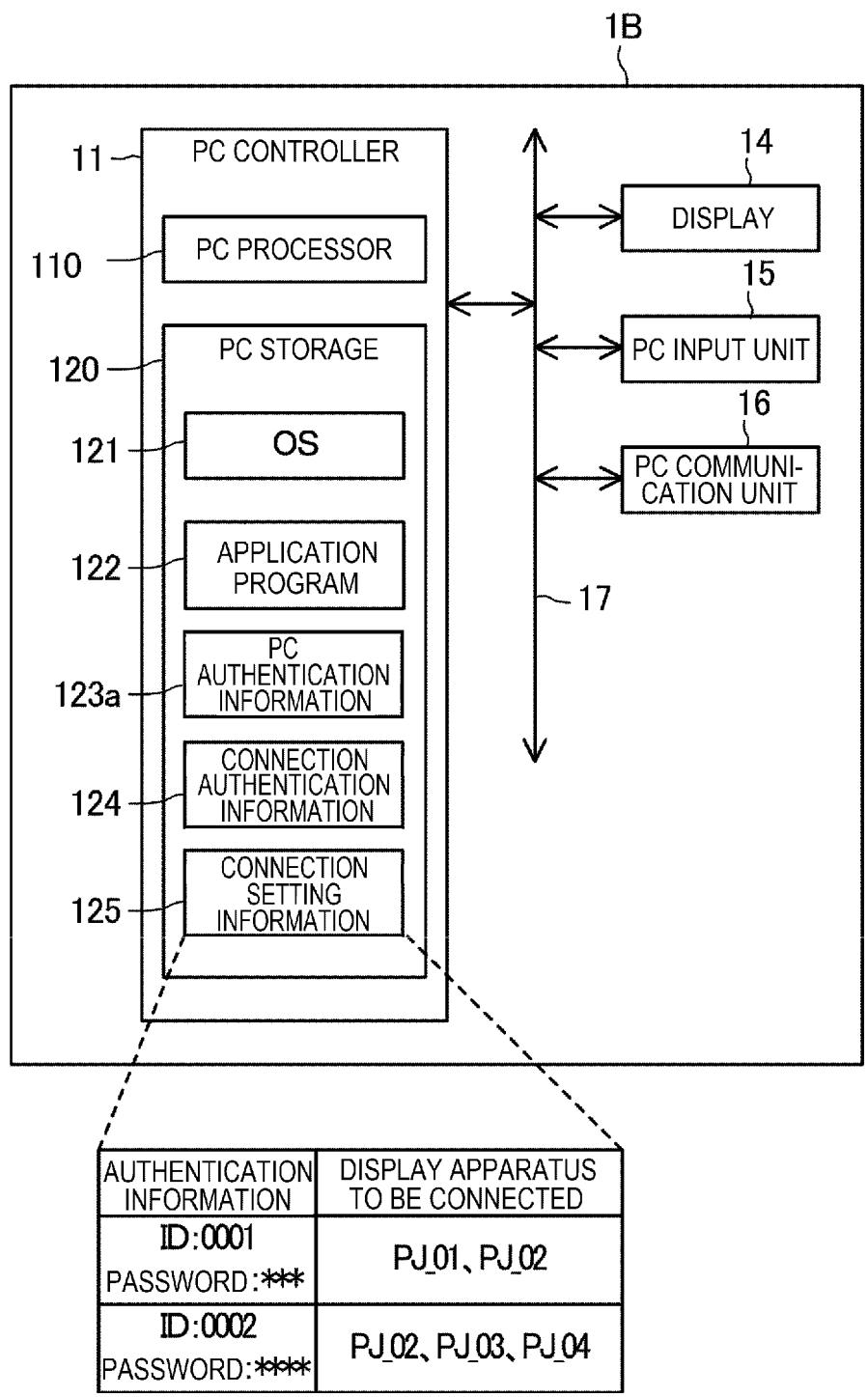
FIG. 9 is a diagram showing a configuration of a PC in a third embodiment.
Figure 10:
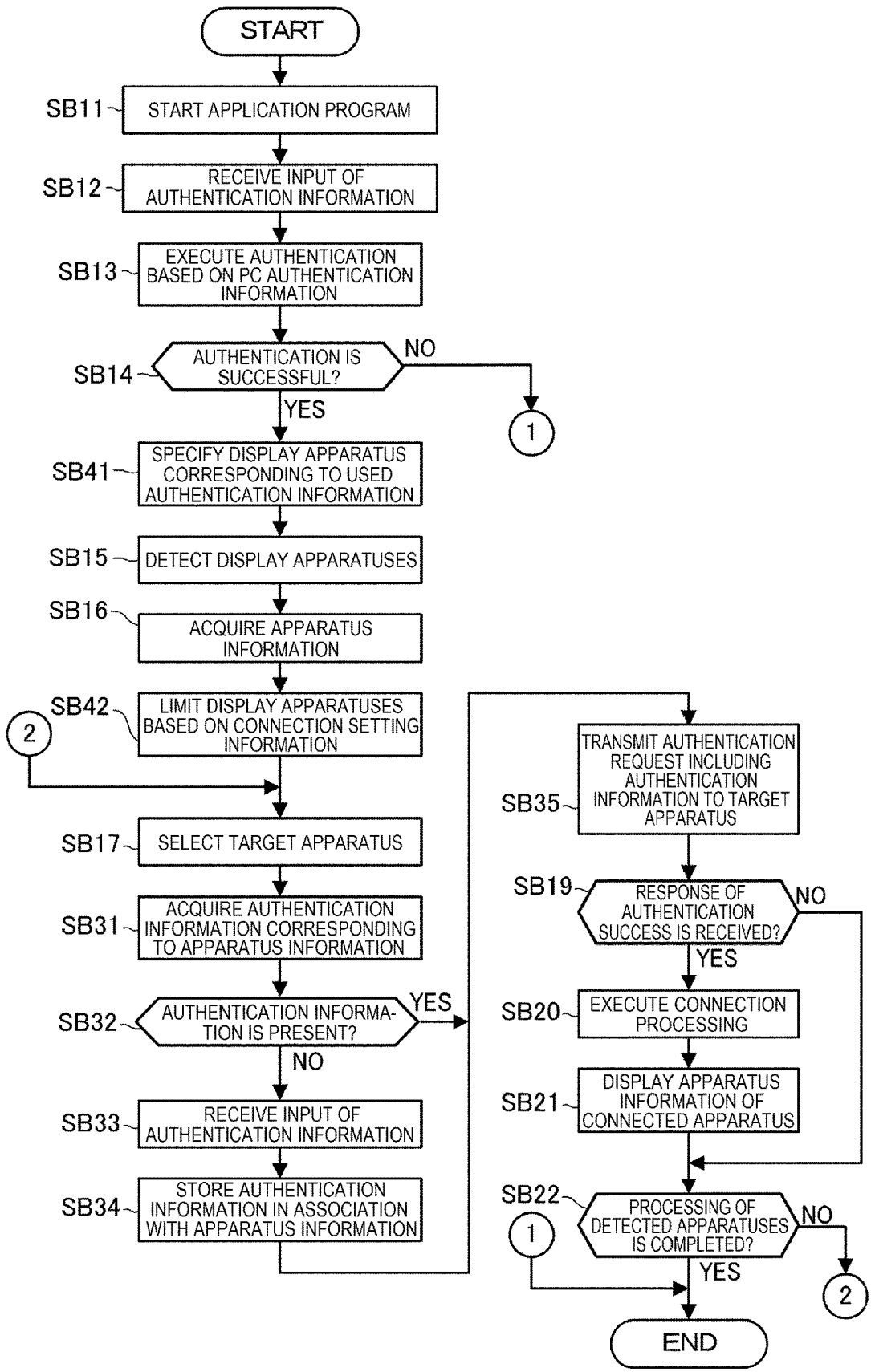
FIG. 10 is a flowchart showing an operation of the PC in the third embodiment.

FIG. 9 is a diagram showing a configuration of a PC 1B in a third embodiment. FIG. 10 is a flowchart showing an operation of the PC 1B in the third embodiment. The third embodiment is explained with reference to the figures. In FIG. 9, components common to the PC 1A explained in the second embodiment are denoted by the same reference numerals and signs and explanation of the components is omitted. In the operation shown in FIG. 10, kinds of processing common to the operation shown in FIG. 8 are denoted by the same step numbers and explanation of the kinds of processing is omitted.

The PC 1B is an information processing apparatus provided instead of the PC 1 in the display system 100 shown in FIG. 1. In the third embodiment, a configuration and an operation of the respective projectors 2 are the same as the configuration and the operation explained with reference to FIG. 4. That is, as in the first embodiment, each of the plurality of projectors 2 executes the authentication processing based on the authentication information 224 stored in the PJ storage 220.

As shown in FIG. 9, in the third embodiment, the PC 1B stores the connection authentication information 124 in the PC storage 120. The connection authentication information 124 is the same as the connection authentication information 124 explained in the second embodiment.

PC authentication information 123a stored in the PC storage 120 by the PC 1B is, like the PC authentication information 123, authentication information used for authentication when the PC 1B starts the application program 122. The PC authentication information 123a includes a plurality of pieces of authentication information. Accordingly, when authentication information received by the PC input unit 15 and any one of the pieces of information included in the PC authentication information 123a satisfy a predetermined condition, authentication by the application program 122 is successful. Therefore, the user can start the application program 122 properly using the plurality of pieces of authentication information.

The PC 1B stores connection setting information 125 in the PC storage 120. The connection setting information 125 is information associating the authentication information included in the PC authentication information 123a and the projectors 2 to which the PC 1B connects. The projectors 2 to which the PC 1B connects are, for example, a part or all of the projectors 2A, 2B, 2C, 2D, and 2E capable of communicating with the PC 1B through the communication network NW.

In the example shown in FIG. 9, the connection setting information 125 includes two pieces of authentication information. PJ_01 and PJ_02 are associated with authentication information including ID:0001 as display apparatuses to be connected. When receiving the authentication information including ID:0001 with the PC input unit 15, the PC controller 11 connects to the projector 2 having a name PJ_01 and the projector 2 having a name PJ_02. The PC controller 11 does not connect to the other projectors 2.

Similarly, the connection setting information 125 associates PJ_02, PJ_03, and PJ_04 with authentication information including ID:0002 as display apparatuses to be connected. Accordingly, when receiving the authentication information including ID:0002 with the PC input unit 15, the PC controller 11 connects to the projector 2 having a name PJ_02, the projector 2 having a name PJ_03, and the projector 2 having a name PJ_04. The PC controller 11 does not connect to a display apparatus different from the projectors 2 set in the connection setting information 125.

In this way, the PC 1B can execute the authentication by the application program 122 with the plurality of pieces of authentication information. The PC 1B connects to, with the function of the application program 122, only a display apparatus corresponding to authentication information received in the authentication by the application program 122. Therefore, the user can designate, by properly using authentication information used for the authentication by the application program 122, the projector 2 to which the PC 1B connects.

At least a part of the plurality of pieces of authentication information included in the connection setting information 125 only has to be different. For example, the same password may be set in association with different IDs.

In the operation of the PC 1B shown in FIG. 10, when succeeding in the authentication processing by the application program 122 (YES in step SB14), the PC controller 11 specifies a display apparatus associated with authentication information used for the authentication processing (step SB41). In step SB41, the PC controller 11 refers to the connection setting information 125.

Thereafter, the PC controller 11 limits, based on the connection setting information 125, the projectors 2 detected in step SB15 (step SB42). In step SB42, the PC controller 11 sets, as an apparatus to which, among the projectors 2 detected in step SB15, the projector 2 specified in step SB41 is connected. That is, in step SB42, the PC controller 11 excludes, from targets of the following processing, apparatuses different from the projector 2 specified in step SB41 among the projectors 2 detected in step SB15.

The PC 1B in the third embodiment is applied, for example, when a use form for selecting and using a part of the projectors 2A, 2B, 2C, 2D, and 2E is effective.

For example, it is assumed that the projector 2A and the projector 2B are disposed to be vertically stacked and the projector 2A and the projector 2B project images onto the same projection surface to be stacked. That is, it is possible to perform stack projection by the projector 2A and the projector 2B. Further, in this example, the projectors 2B, 2C, and 2D are disposed side by side in the horizontal direction or the vertical direction and can perform tiling projection. Specifically, a projection image of the projector 2B, a projection image of the projector 2C and a projection image of the projector 2D are connected to project one large projection image.

When causing the projector 2A and the projector 2B to execute the stack projection, the PC 1B performs control for causing the projector 2A and the projector 2B to project the same image. In this case, the PC 1B performs, for example, control for causing the projector 2A and the projector 2B to select the same image source and control for causing the projector 2A and the projector 2B to perform geometric correction to match the same projection surface. The control of the PC 1B for causing the projector 2A and the projector 2B to perform the stack projection corresponds to an example of a first control mode.

When causing the projectors 2B, 2C, and 2D to execute the tiling projection, the PC 1B performs control for causing the projectors 2B, 2C, and 2D to perform the tiling projection. The PC 1B performs, for example, control for causing the projectors 2B, 2C, and 2D to execute edge blending processing and control for causing the projectors 2B, 2C, and 2D to execute correction for uniformizing color tones and the like of projection images of the projectors 2B, 2C, and 2D. The control of the PC 1B for causing the projectors 2B, 2C, and 2D to perform the tiling projection corresponds to an example of a second control mode.

In this way, the PC 1B is capable of selecting and executing one of the first control mode for causing the projector 2B to execute the stack projection and the second control mode for causing the projector 2B to execute the tiling projection.

When desiring to cause the projector 2A and the projector 2B to execute the stack projection, the user inputs the authentication information including ID:0001 and performs the authentication by the application program 122. The authentication information corresponds to an example of fourth authentication information. In this case, the PC 1B connects to, according to the connection setting information 125, only the projector 2A and the projector 2B associated with the authentication information including ID:0001. When the authentication information including ID:0001 is input and authentication is executed based on the authentication information, the PC 1B selects the first control mode. The PC 1B executes, with the function of the application program 122, control for causing the projector 2A and the projector 2B to perform the stack projection. That is, the PC 1B controls the projectors 2A and 2B in the first control mode.

When desiring to cause the projectors 2B, 2C, and 2D to execute the tiling projection, the user inputs the authentication information including ID:0002 and performs the authentication by the application program 122. The authentication information corresponds to an example of fifth authentication information. In this case, the PC 1B connects to, according to the connection setting information 125, only the projectors 2B, 2C, and 2D associated with the authentication information including ID:0002. When the authentication information including ID:0002 is input and authentication is executed based on the authentication information, the PC 1B selects the second control mode. The PC 1B executes, with the function of the application program 122, control for causing the projectors 2B, 2C, and 2D to perform the tiling projection. That is, the PC 1B controls the projectors 2B, 2C, and 2D in the second control mode.

With the PC 1B, the user is capable of selecting, by properly using the authentication information, a display apparatus or a combination of display apparatuses to which the PC 1B connects. Accordingly, it is possible to reduce work concerning selection of the projector 2, further reduce the burden on the user, and achieve improvement of convenience.

In the configuration explained above, the PC 1B may set the operation of the projector 2 according to the authentication information received by the PC input unit 15. In the example explained above, when receiving the authentication information including ID: 0001 with the PC input unit 15, after connecting to the projectors 2A and 2B, the PC 1B may transmit setting information for the stack projection to the projectors 2A and 2B. When receiving the authentication information including ID:0002 with the PC input unit 15, after connecting to the projectors 2B, 2C, and 2D, the PC 1B may transmit setting information for the tiling projection to the projectors 2B, 2C, and 2D. In this example, the use can optimize setting concerning the operation of the projector 2 by properly using the authentication information.

The configuration explained in the third embodiment achieves the same effects as the effects of the configurations explained in the first embodiment and the second embodiment.

Further, in the control method for the information processing apparatus according to the third embodiment of the present disclosure, the PC 1B controls a fourth display apparatus according to the application program 122. The control method includes the PC 1B storing third authentication information different from the first authentication information and the second authentication information in association with the fourth display apparatus. The control method includes the PC 1B receiving fourth authentication information or fifth authentication information different from the fourth authentication information. The control method includes the PC 1B transmitting a connection request including the third authentication information to the fourth display apparatus via the communication network NW according to the reception of the fourth authentication information or the fifth authentication information. The control method includes, when succeeding in authentication by the fourth display apparatus, the PC 1B connecting to the fourth display apparatus according to the application program 122. The control method includes the PC 1B controlling the fourth display apparatus in the first control mode according to the application program 122 when receiving the fourth authentication information and controlling the fourth display apparatus in the second control mode according to the application program 122 when receiving the fifth authentication information. The fourth display apparatus is any one of the projectors 2A, 2B, 2C, 2D, and 2E and is the projector 2B in the example explained above. The third authentication information is authentication information included in the connection authentication information 124 in association with the fourth display apparatus. The fourth authentication information and the fifth authentication information are, for example, authentication information authenticated based on the PC authentication information 123a and can be considered authentication information included in the connection setting information 125.

With this method, the user can properly use a plurality of pieces of authentication information as authentication information in causing the application program 122 to operate in the PC 1B. The user can designate the projector 2 to which the PC 1B connects and cause the PC 1B to execute the connection by properly using the authentication information. Accordingly, it is possible to reduce work concerning selection of the projector 2, further reduce the burden on the user, and achieve improvement of convenience.

4. Other Embodiments

The first and second embodiments explained above are preferred modes of implementation of the present disclosure. However, the present disclosure is not limited to the embodiments. Various modified implementations are possible without departing from the gist of the present disclosure.

For example, in the embodiments explained above, the display system 100 adopting the projector 2 as an example of the display apparatus is explained. However, the display apparatus to which the present disclosure is applied is not limited to the projector 2. For example, the display apparatus may be a liquid crystal display that displays an image on a liquid crystal display panel or may be a display apparatus that displays an image on a plasma display panel or an organic EL (Electro Luminescence) panel. In this case, the liquid crystal display panel, the plasma display panel, or the organic EL panel corresponds to an example of a display.

The configurations of the PC controller 11 and the PJ controller 21 are not limited. The PC controller 11 and the PJ controller 21 may be realized by a plurality of processors or a plurality of semiconductor devices.

The functional units of the projector 2 shown in FIG. 2 indicate functional components. Specific implementation forms of the functional units are not particularly limited. Similarly, the functional units of the PC 1, PC 1A, and PC 1B shown in FIGS. 3, 7, and 9 indicate functional components. Specific implementation forms of the functional units are not particularly limited. Hardware individually corresponding to the illustrated functional units does not need to be implemented. It is naturally possible to adopt a configuration in which one processor executes a program to realize functions of a plurality of functional units. A part of functions realized by software in the embodiments may be realized by hardware. Apart of functions realized by hardware in the embodiments may be realized by software.

The processing units of the flowcharts shown in FIGS. 4, 5, 8, and 10 are divided according to main processing contents in order to facilitate understanding of the processing of the PC controller 11 and the PJ controller 21. The present disclosure is not limited by a way of division and names of the processing units. These kinds of processing can be divided into, according to processing contents, a larger number of processing units and can be divided such that one processing unit includes a larger number of kinds of processing. The processing order of the flowcharts explained above is not limited to the illustrated example.

The OS 121 and the application program 122 to be executed by the PC controller 11 and the control program 221 to be executed by the PJ controller 21 can also be recorded in, for example, a recording medium to be readable by the PCs 1, 1A, and 1B and the projector 2. As the recording medium, a magnetic or optical recording medium or a semiconductor memory device can be used. Specific examples of the recording medium include portable or stationary recording media such as a flexible disk, a CD-ROM (Compact Disk Read Only Memory), a DVD (Digital Versatile Disc), a Blu-ray (registered trademark) Disc, a magneto-optical disk a flash memory, and a card-type recording medium. The control method explained above can also be realized by storing these programs in a server apparatus or the like and downloading a control program from the server apparatus.

What is claimed is:

1. A control method for an information processing apparatus comprising:
    receiving an input of first authentication information;
    performing authentication based on the first authentication information according to a program for controlling a first display apparatus;
    when the authentication based on the first authentication information is successful, transmitting a connection request including the first authentication information to the first display apparatus via a communication network;
    when the authentication by the first display apparatus is successful, connecting to the first display apparatus according to the program;
    storing second authentication information different from the first authentication information in association with a second display apparatus controlled by the program;
    receiving third authentication information or fourth authentication information different from the third authentication information;
    transmitting a connection request including the second authentication information to the second display apparatus via the communication network according to the reception of the third authentication information or the fourth authentication information;
    when authentication by the second display apparatus is successful, connecting to the second display apparatus according to the program;
    when receiving the third authentication information, controlling the second display apparatus in a first control mode according to the program; and
    when receiving the fourth authentication information, controlling the second display apparatus in a second control mode according to the program.

2. A non-transitory computer-readable storage medium storing a program for controlling a display apparatus, the program causing an information processing apparatus to execute processing comprising:
    receiving an input of authentication information;
    performing the authentication based on the authentication information;
    when the authentication based on the authentication information is successful, transmitting a connection request including the authentication information to the display apparatus via a communication network;
    when the authentication by the display apparatus is successful, connecting to the display apparatus;
    storing second authentication information different from the first authentication information in association with a second display apparatus controlled by the program;
    receiving third authentication information or fourth authentication information different from the third authentication information;
    transmitting a connection request including the second authentication information to the second display apparatus via the communication network according to the reception of the third authentication information or the fourth authentication information;
    when authentication by the second display apparatus is successful, connecting to the second display apparatus according to the program;
    when receiving the third authentication information, controlling the second display apparatus in a first control mode according to the program; and
    when receiving the fourth authentication information, controlling the second display apparatus in a second control mode according to the program.

\* \* \* \* \*